United States Patent [19]

Gelardi et al.

[11] 4,275,943
[45] Jun. 30, 1981

[54] CONTAINER FOR A CASSETTE

[75] Inventors: Anthony Gelardi, Kennebunkport; Paul Gelardi, Cape Porpoise; Stephen Swinburne, Scarborough; Michael Janiszewski, Biddeford; Robert MacLeod, Jr., Kennebunkport; James Philippe; David Philippe, both of Sanford, all of Me.

[73] Assignee: Shape Inc., Biddeford, Me.

[21] Appl. No.: 135,886

[22] Filed: Mar. 31, 1980

[51] Int. Cl.³ .................... A47B 88/00; B65D 85/672
[52] U.S. Cl. .................................. 312/319; 312/12; 312/13; 312/111; 206/387; 220/23.4
[58] Field of Search ............... 312/8, 9, 10, 11, 12, 312/13, 14, 15, 16, 17, 18, 19, 111, 319; 206/387; 220/23.4

[56] References Cited

U.S. PATENT DOCUMENTS

| 3,133,771 | 5/1964 | Dorman | 312/111 X |
|---|---|---|---|
| 3,836,222 | 9/1974 | Kuntze | 312/319 |
| 3,899,229 | 8/1975 | Ackeret | 312/319 |
| 4,030,601 | 6/1977 | Ackeret | 206/387 |
| 4,046,255 | 9/1977 | Ackeret | 312/319 X |
| 4,067,629 | 1/1978 | Amatsu et al. | 312/319 |
| 4,087,145 | 5/1978 | Weavers | 312/319 |
| 4,191,292 | 3/1980 | Schweizer | 206/387 |

*Primary Examiner*—Victor N. Sakran
*Attorney, Agent, or Firm*—Staas & Halsey

[57] ABSTRACT

A container for holding a cassette that includes a rectangular casing into which a cassette can be directly inserted and stored and a frame-like bottomless slide which is positioned in the casing and selectively operated for moving the cassette into and out of the casing. An hourglass-type spring is positioned between the slide and casing to urge the slide to an upwardly extended cassette-exposing position. A selectively releasable locking mechanism for retaining the slide in a cassette-storing position includes a finger pressure contact indentation formed in the front wall of the slide and double-latch locking projections formed on the front of the slide and casing at opposite sides of the finger pressure contact indentation. Hublock projections formed on the slide engage the hub-openings of a stored cassette only when the slide is in its cassette-storing position. The configuration of the slide and casing is such to provide smooth and easy operation of the container and to ensure continued satisfactory and proper operation by not being highly vulnerable to misalignment, warping and dimensional variations in the component parts. The casing and slide are formed of a single piece of moldable material with all the subcomponents (except the spring) being integrally molded as a part of the casing or slide.

37 Claims, 12 Drawing Figures

CONTAINER FOR A CASSETTE

BACKGROUND OF THE INVENTION

The present invention relates to a container for a cassette. More particularly, the invention relates to a cassette container comprising a rectangular casing into which a cassette can be directly inserted and stored and a frame-like bottomless slide which is positioned in the casing and selectively operated for moving the cassette into and out of the casing.

Many of the known cassette containers have complicated structural arrangements and/or have overall dimensions significantly larger than the stored cassette. Additionally, such cassette containers frequently require the stored cassette to be inserted in a particular direction and in a rather impractical, cumbersome and awkward manner of insertion into and removal from the stored cassette. One of the principal reasons for the above problems is the requirement for storing the cassette in a drawer holder with the drawer holder in turn being slid into the container housing. Cassette containers having drawers, including drawers that are spring-biased, are known in the art.

A cassette container which allows a stored cassette to be inserted into and removed directly from a casing with a frame-like bottomless slide positioned in the casing and selectively operated for moving the cassette in and out of the casing eliminates many of the drawbacks of the cassette drawer-type containers. That is, it provides an easier, less cumbersome way of inserting and removing a cassette and it has an overall reduced dimension. Prime considerations are to provide a simple structural configuration, yet ensure that this container is easily and smoothly operated and durable under continued and different operating conditions. These requirements dictate fine alignment of the components. The design of the cassette container, moreover, must be adaptable to high-volume, low-cost and easy mass production of the component parts and assembly of the container.

One of the most advantageous methods for producing a low-cost, high-volume cassette container is by industrial molding of the component parts. It is in this environment where problems occur in providing a satisfactory cassette container having all of the necessary and desirable features, including insertion of a cassette directly into the casing.

SUMMARY OF THE INVENTION

Accordingly, it is a primary object of this invention to eliminate the above-described problems in containers for cassettes yet maintain all of the required features and provide significant additional desirable features for cassette containers.

A specific object of this invention is to provide for the direct insertion of a tape cassette into a cassette storage casing.

A further object of this invention is to allow the cassette to be inserted in more than one direction into the container.

Another object of this invention is to provide minimum overall dimensions for a cassette container.

Yet another object of this invention is to provide for easy grasping and manipulation of the cassette directly into and out of the cassette storage casing for a cassette container with the features set forth above.

Still a further object of this invention is to allow easy low-cost mass production of components from moldable materials for a cassette container with the features set forth above.

Still another object of this invention is to provide easy and simple assembly for a cassette container with the features set forth above consisting of three major components, namely, a casing, a slide and a spring biasing means.

Still a further object of this invention is to provide for smooth and easy operation of a cassette container with the features set forth above and to ensure continued satisfactory and proper operation by not being highly vulnerable to misalignment, warping and dimensional variations in the component parts.

Finally, it is an object of the invention to provide a cassette container having the above features wherein the casing and the slide are each formed of a single piece of moldable material with all the subcomponents (except the spring) integrally molded as part of the casing or slide.

Additional objects and advantages of the invention will be set forth in part in the description which follows, and in part will be obvious from the description, or may be learned by practise of the invention. The objects and advantages of the invention may be realised and obtained by means of the instrumentalities and combinations particularly pointed out in the appended claims.

To achieve the foregoing objects and in accordance with the purpose of this invention, as embodied and broadly described herein, the container for a cassette comprises: (1) a rectangular casing having top, bottom and side walls, a rear wall and an open front; (2) a frame-like bottomless slide reciprocally received in the casing for urging a cassette along the inner surface of the casing bottom wall, the slide being slidable between a cassette-storing position within the casing and a cassette-exposing position partially-extended upwardly and outwardly from the casing and comprising side, rear and front walls, and a partial cutaway supporting and mounting top wall, wherein the top wall has a first section formed adjoining the rear and side slide walls, wherein the said side walls have upper edges tapered inwardly from the rear to a middle portion for allowing an upwardly tilting inclination of the slide against the casing top wall in the cassette-exposing position and lower edges tapered inwardly from the middle portion to the front for increased access to a stored cassette in the cassette-exposing position and for providing a pivoting point for the front portion of the slide in the cassette-storing position; (3) spring means positioned between the rear walls of the casing and slide for biasing the slide toward the upwardly and outwardly extended cassette-exposing position; (4) selectively releasable locking means comprising (a) contact means for allowing finger pressure to be exerted downwardly on the slide to release the slide from a locked cassette-storing position and to selectively move the slide between the cassette exposing and storing positions, the contact means comprising a concave indentation formed in the outer surface of the front and top slide walls and a concave indentation formed in the forward edge of top casing wall for providing access to the slide concave indentation when the slide is in the locked position, and (b) locking means for retaining the slide in the cassette-storing position, the locking means comprising projections formed on the outer surface of the slide top wall second section adjacent and at opposite ends of the slide concave indentation, a recess formed in the inner surface of the casing top wall adjacent the casing concave indentation for receiving the slide locking projections when the slide is in the cassette-storing position in the casing, and fingers formed at opposite forward ends of the recess adjacent the casing concave indentation for lockingly engaging the slide locking projections when the slide is in the cassette-storing position; and (5) stop and pivoting means for limiting movement of the slide to the partially-extended upwardly and outwardly cassette-exposing position, the stop and pivoting means comprising a pair of projections formed on the upper edge of the rear slide wall and a pair of grooves formed parallel to the side casing walls in the inner surface of the top casing wall and in which the slide stop projections slidably move, the slide stop projections engaging the forward ends of the grooves for limiting further outward movement of the slide from the casing and for establishing a pivoting point for the upwardly tilting movement of the slide against the top casing wall in the cassette-exposing position.

In the preferred embodiment, the container further comprises guide means for maintaining the cassette in a level position in the casing and for providing alignment of the spring means and slide during assembly insertion into the casing, the guide means comprising a pair of ribs formed parallel to the side casing walls on the inner surface of the bottom casing wall and a pair of clearance slots formed in the lower edge of the rear slide wall for accommodating the ribs; and hublock means for lockingly engaging the hub-openings of an inserted cassette only when the slide is in the cassette-storing position, the hublock means comprising a first hublock projection mounted from the top slide wall first section extending downwardly and having an inwardly tapered forward end for preventing interference with the lead edge of a cassette being inserted into the casing and a second hublock projection mounted from the top slide wall second section extending downwardly.

Further, in the preferred embodiment, the spring means comprises an hourglass-type spring which collapses inside itself and which is positioned between the central portions of the casing and slide rear walls from the side walls and provides a biasing force against the lower portion of the rear slide wall.

In the preferred embodiment, the slide has a lower edge of the rear wall positioned above the lower edge of the side walls for reducing drag on the inside surface of the bottom casing wall during sliding and pivoting movement of the slide and an upper edge of the rear wall positioned above the top slide wall first section for reducing interference between the top slide wall first section and the inside surface of the top casing wall during sliding and pivoting movement of the slide. Additionally, the slide side walls have lower rear edges tapered inwardly for ensuring the upward and pivoting movement of the slide against the top casing wall in the cassette-exposing position and the slide wall upper edges being rounded for facilitating movement of the slide in and out of the casing.

It is also preferable that the container in accordance with the invention further comprise a pair of interference ribs formed parallel to the side casing walls at the rear portion of the casing inner surface top wall for engagement against the top slide wall first section to ensure proper alignment and positioning of the first hublock projection during operating conditions with a pair of clearance slots formed on the upper edge of the rear slide wall for accommodating the casing interference ribs during sliding movement of the slide. A pair of bosses may be formed on the outer surface of the top slide wall first section for providing two engaging points with the casing interference ribs.

Finally, the container in accordance with this invention may further comprise mating track means as described in greater detail hereinafter formed on the top and bottom and side walls of the casing for detachably connecting the casing to another similar casing horizontally or vertically to form a block. The track means in the preferred embodiment forms dovetail joints and comprises male dovetails formed on the top casing wall and one of the side casing walls and female dovetails formed on the bottom casing wall and the other of the side casing walls. Locking and positioning means may be provided for positioning the casings to be connected together in a front even alignment, the locking and positioning means comprising female notches formed in the forward edge of the top casing wall and one of the side casing walls and male nodules formed at the forward edge of the bottom casing wall and the other of the side casing walls.

BRIEF DESCRIPTION OF THE DRAWINGS

The accompanying drawings, which are incorporated in and constitute a part of this specification, illustrate an embodiment of the invention and, together with the description, serve to explain the principles of the invention.

DETAILED DESCRIPTION OF THE PREFERRED EMBODIMENT

Reference will now be made in detail to the present preferred embodiment of the invention, an example of which is illustrated in the accompanying drawings.

The cassette container, in accordance with the invention and as best illustrated in FIGS. 1 and 5–9, basically comprises a casing 16 into which a cassette to be stored can be directly inserted, a slide 18 slidably positioned in the casing 16 for moving the cassette in and out of the casing, and spring means 20 for biasing the slide 18. As will be described hereafter in greater detail, the slide has a particular configuration and additional components are provided on the casing 16 and slide 18 so that the slide has a smooth and easy movement in and out of the casing and to ensure that the cassette is durable under continued and different operating conditions. The design of the casing, slide and other components, moreover, is such to allow high volume, low-cost and easy mass production of the component parts and assembly of the container. This is achieved by being able to form a two-piece injected molded construction of the casing, slide and components (excepting the spring means) for the cassette container. The design of the cassette container components has also been such to provide a very compact and versatile cassette container. That is, the dimensions have been minimized and the cassette container can be interlocked with other similar cassette containers for storage.

Figure 1:
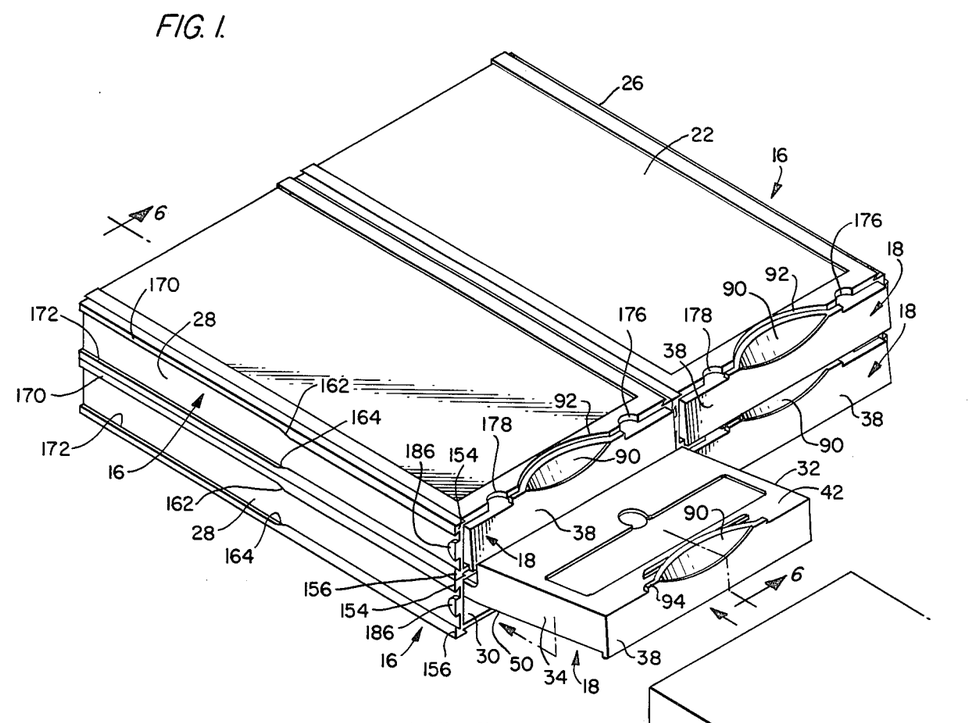
FIG. 1 is a perspective view of a series of cassette containers in accordance with the invention showing them detachably connected in stacked and side-by-side relation to each other and illustrating in particular the manner of inserting a cassette into a container which is in its open position.
Figure 6:
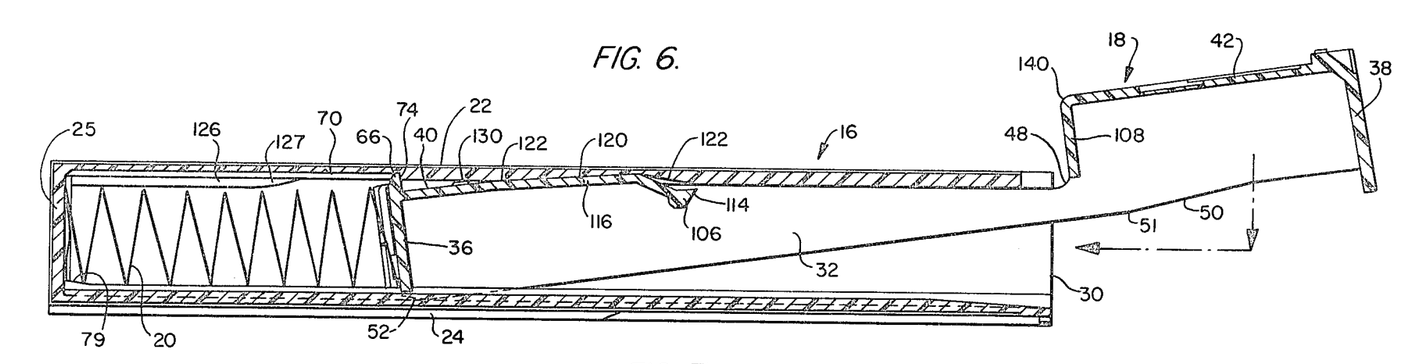
FIG. 6 is a side cross-sectional view of the cassette container in accordance with the invention taken along line 6—6 in FIG. 1 showing the cooperation of the spring, casing, and the slide of the container when the slide is in its upwardly and outwardly extended cassette-exposing position.

As herein embodied, the casing 16 of the cassette container is rectangular in shape and has a top wall 22, a bottom wall 24, two side walls 26 and 28, and an open front end 30. As best seen in FIGS. 1 and 6, a cassette can be inserted into and removed directly from the casing 16 when the slide 18 is in its outwardly-extended cassette-exposing position simply by moving the cassette along the inner surface of the casing 16, such as bottom wall 24. The casing has dimensions advantageously corresponding to the dimensions of the cassette because the cassette does not have to be first positioned on a casing drawer. It can be seen also that the cassette can be inserted in varied ways—e.g., upside down and/or backwards.

The slide 18 of the cassette container, as herein embodied and as best seen in FIGS. 1, 6–7 and 11, has a frame-like bottomless configuration and is reciprocally received in the casing 16 for urging a cassette along the inner surface of the casing, e.g., the bottom wall 24. Slide 18 is slidable between a cassette-storing position (FIG. 7) within the casing and a cassette-exposing position partially-extended upwardly and outwardly from the casing 16 (FIG. 6). The outwardly-extended cassette-exposing position of the slide is also shown in FIG. 1 where a plurality of the cassette containers in accordance with the invention are shown releasably connected together to form a modular storage system.

Figures 9, 10, 11:
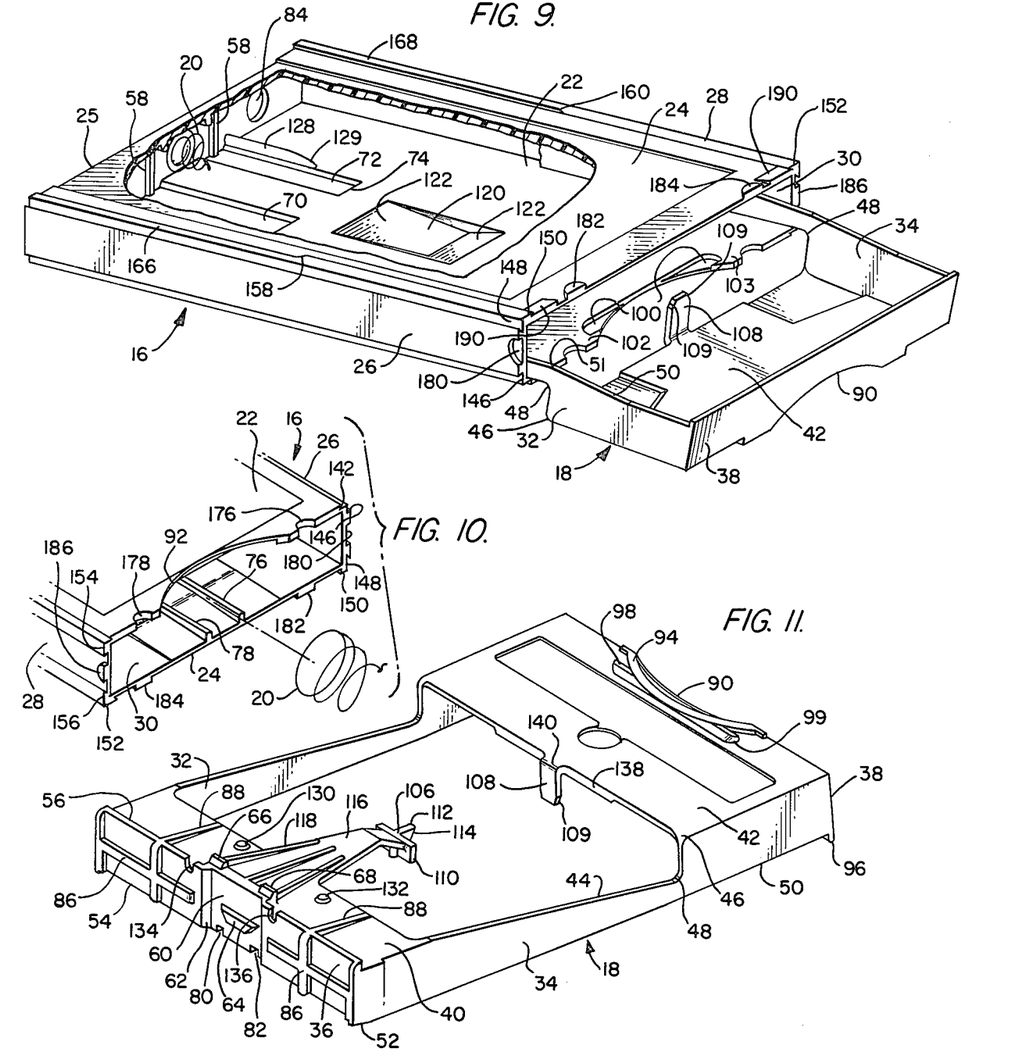
FIG. 9 is a perspective fragmented bottom view of the cassette container made in accordance with the invention, illustrating in particular the components formed on the top inner surface of the casing of the container.
FIG. 10 is a partial perspective fragmented view of the casing and spring of the cassette container made in accordance with the invention showing the front opening of the casing and the spring being inserted into the casing during assembly of the container.
FIG. 11 is a perspective view of the slide of the cassette container made in accordance with the invention separated from the casing.

As best seen from FIG. 11, the slide 18 has side walls 32 and 34, a rear wall 36, a front wall 38, and a partial cutaway supporting and mounting top wall having a first section 40 formed adjoining the side and rear walls 32, 34 and 36, respectively, and a second section 42 formed adjoining the side and front walls 32, 34 and 38, respectively. As will be described in further detail below, the slide top wall first and second sections 40 and 42 are provided for mounting certain additional components of the container and for supporting the rear and front portions of the slide, particularly desirable since the slide should be formed with minimum thickness dimensions and of a single piece of molded material.

The configuration of the slide 18 is significant because it achieves the proper and an easy and smooth movement of the slide in the casing, pivoting of the slide 18 into an outwardly-extended tilted position in the cassette-exposing position and insertion and removal of the cassette in and out of the casing 16 when the slide is in its cassette-exposing position. As seen in FIG. 11, slide 18 has no bottom so as to allow a cassette to be stored in the container to be directly inserted into the casing 16 by movement along the casing bottom wall 24. As embodied herein, the slide side walls 32 and 34 both have upper edges 44 inwardly tapered from the rear portion of the slide to a middle portion of the slide for achieving the upward tilting inclination of the slide against the casing top wall 22 in the slide's outwardly-extended cassette-exposing position (FIG. 6). The upper edges of the slide in the tapered middle portion, such as at points 46 and 48 shown in FIG. 11, should be rounded to ensure a smooth insertion of the slide in and out of the casing and to prevent catching of the slide on the front portion of an adjacent second container releasably connected to and stacked on top of the first container, as illustrated in FIG. 1.

Figure 7:
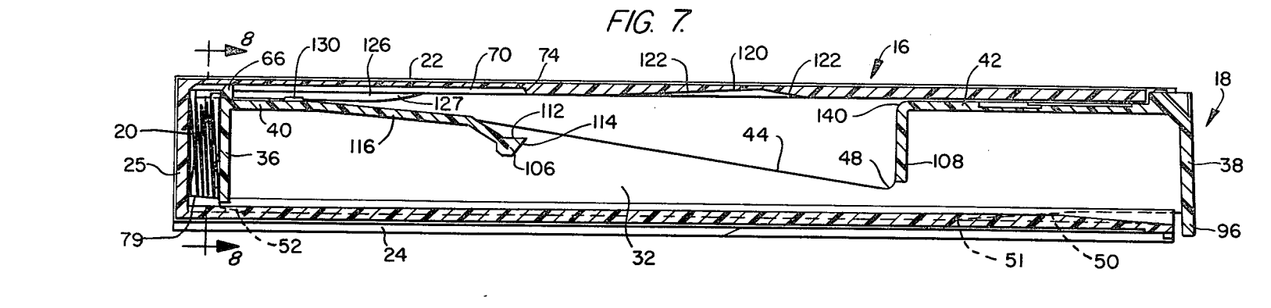
FIG. 7 is a side cross-sectional view of the cassette container made in accordance with the invention taken along the line 6—6 in FIG. 1 showing the cooperation of the spring, casing, and the slide of the container when the slide is in its cassette-storing position.

In addition to the above, slide side walls 32 and 34 have lower edges 50 inwardly tapered from the middle portion of the slide to the front portion of the slide for allowing increased access to a cassette in the slide's cassette-exposing position and for providing a pivoting point for the front portion of the slide in the cassette-storing portion. As best seen in FIG. 6, the tapered lower edge 50 of the front portion of the slide allows more access to the front open end of the casing 16 for either inserting or removing a cassette from the casing than would normally be provided if the lower edge of the slide was straight. More significantly and as will be explained in greater detail below, when the slide 18 is in its locked cassette-storing position within the casing, as illustrated in FIG. 7, the front tapered lower edge 50 of the slide allows the front portion of the slide to bend slightly downwardly in the casing upon exertion of pressure by the operator to release the slide from its locked position. The fulcrum point of this slight bending motion is near the narrow cross-sectional portion of the slide at point 51 where the tapered lower edge meets the straight lower edge of the slide. This particular configuration provides a very simple method for selectively releasing locking means of the cassette container while maintaining the simplicity in the design for injection molding the slide of a single piece of plastic material.

Finally, the side walls 32 and 34 have their lower edges inwardly tapered at the rear at points 52 from the middle portion of the slide to the rear of the slide. These tapered rear lower edges 52 allow the rear end of the slide to pivot to the upward tilting inclination in the cassette-exposing position, as best illustrated in FIG. 6. Without the provision of these lower rear tapered edges 52 on the slide side walls 32 and 34, a proper pivoting operation of the slide might not always be effected because of possible interference of the rear lower edge of the slide against the inner surface of the casing bottom wall. This is particularly true if for whatever reason the casing bottom wall was slightly bowed or the dimensions between the inner surfaces of the casing and the slide were at a minimum tolerance.

Figure 8:
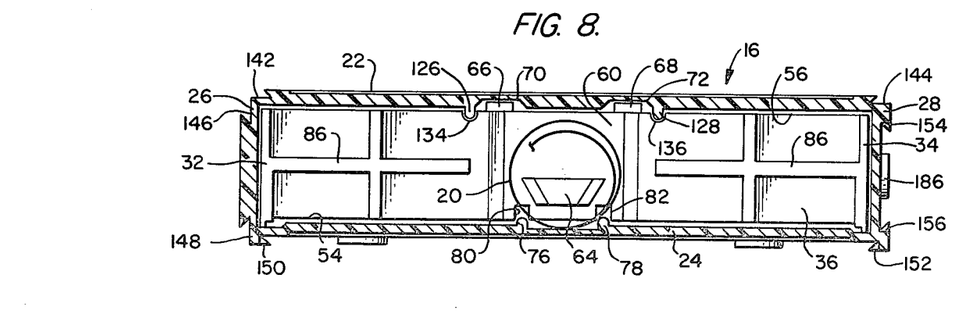
FIG. 8 is a rear cross-sectional view of the cassette container in accordance with the invention taken along line 8—8 in FIG. 7 illustrating in particular the slide within the casing when the slide is in its cassette-storing position.

To further enhance the smooth sliding movement and pivoting of the slide 18, the slide rear wall 36 has its lower edge 54 raised above the lower edges of the two side walls 32 and 34. By doing so, drag on the inside surface of the casing bottom wall is reduced during movement of the slide between the cassette-storing and cassette-exposing positions. It has been found that without this raised lower edge 54 of the slide rear wall, there is a rougher movement of the slide in the casing and in certain conditions it may prevent a movement of the slide in the casing from its closed to its open position. For similar reasons, the slide rear wall has an upper edge 56 raised above the top wall first section 40 for reducing interference between the top wall section 40 and the inner surface of the casing top wall during movement of the slide between cassette-storing and cassette-exposing positions. It can be further seen that the raised upper edge 56 of the slide rear wall 36 above the top wall first section 40 would provide only two pivoting points if necessary advantageously at the sides of the slide when the slide is urged into its upwardly tilted inclination against the casing top wall in the cassette-exposing position. The positioning of the upper and lower edges 56 and 54 of the slide rear wall 36 are best illustrated in FIGS. 8 and 11.

As herein embodied and as best seen in FIG. 6, the spring means of the cassette container comprises a spring 20 positioned between the casing rear wall 25 and the slide rear wall 36 for biasing the slide 18 toward its outwardly-extended cassette-exposing position. While any type of biasing spring might achieve this basic operation, it has been found that a spring which is particularly advantageous in the design of the cassette container in accordance with the invention is one which collapses inside itself and, more particularly, an hourglass-type spring. Use of a spring which collapses inside itself will minimize the required space for positioning of the spring formed between the rear walls 25 and 36. This, obviously, minimizes the overall dimension of the cassette container.

The hourglass-type spring has been discovered to provide an xtremely smooth sliding movement to the slide 18 within the casing as well as to enhance the tilting movement of the slide upwardly into the cassette-exposing position, as illustrated in FIG. 6. More specifically, the hourglass spring provides a more even force throughout the slide movement because of a relatively even spring rate throughout the spring. In contrast, a conical spring has a high spring rate at the small end which would cause the force required to close the slide to increase greatly as the closed position is approached. This would thus cause the slide to move less smoothly. It would also apply more pressure to the rear wall of the slide in the closed position, thereby increasing the chance of deflection of the rear slide wall, particularly under high temperature conditions.

Due to the large bases at the opposite ends of an hourglass-type spring, this spring has the additional advantage of eliminating the need for a retaining device to attach and hold the spring in position. Thus the step of attaching the spring during assembly to such a retaining device has also been eliminated.

To align the hourglass spring 20 between the casing and slide rear walls 25 and 36 respectively, the inner surface of the casing rear wall 25 is integrally formed with a pair of spaced parallel horizontal ribs 58 in the center portion between which is positioned one end of the hourglass spring 20. The slide rear wall 36 is also integrally formed with a recess 60 in its central outer surface for positioning of the other end of the hourglass spring 20. It is preferred to either chamfer vertical edges 62 of the recess 60 formed in the slide rear wall or to provide a substantially horizontal rib 64 below the center portion of the recess 60. This is done to orient and align the hourglass spring into position against the slide recess 62 during assembly of the cassette container. It should be noted that a positive locking or attachment of the spring to the casing and slide is not required for proper operation of the cassette container, and the attachment step is not necessary during assembly.

To prevent the slide 18 from being totally ejected from the casing 16 by the biasing force of the spring 20 acting against the slide and to provide the proper pivoting position of the slide for its upwardly extended cassette-exposing position, the container further comprises stop and pivoting means for limiting the movement of the slide 18 to its partially-extended upwardly and outwardly cassette-exposing position, as best illustrated in FIGS. 1, 6 and 9. While there may be various types of stop and pivoting means to achieve this basic operation, it was found particularly advantageous for the container of this invention that the stop and pivoting means comprise a pair of projections 66 and 68 integrally formed on the upper edge 56 of the slide rear wall 36 which slidably engage and move, respectively, in a pair of track grooves 70 and 72 formed parallel to the side casing walls in the inner rear surface of the casing top wall 22. As embodied herein, the projections 66 and 68 are provided on the upper edge 56 of the slide rear wall 36 at opposite sides of the spring recess 60 so that the end of the spring 20 is positioned therebetween. As best seen in FIG. 6, when the slide projections 66 and 68 reach the front end 74 of the track grooves 70 and 72 respectively, during the movement of the slide the biasing force of the spring 20 against the slide rear wall 36 causes the slide to pivot at end 74 and to move in an upwardly-tilted inclination against the inner surface of the casing top wall 22. As described previously, the rear lower tapered edges 52 of the slide 18 ensure that there is a proper pivoting of the rear portion of the slide about point 74. Because a pair of projections and track grooves are used and the spring 20 is located between these projections and grooves during the movement of the slide, as can be seen from FIGS. 8 and 9, the biasing force against the slide and the longitudinal movement of the slide toward the front portion of the casing are stabilized. Because of the simplistic configuration of the projections 66 and 68 and the track groove 70 and 72, there is the further advantage in injection molding the slide and casing.

To ensure that a cassette being inserted along the bottom of the casing is placed in a proper position, the container as herein embodied further includes guide means for maintaining the cassette in a level position in the casing. In addition, this guide means has the important function of providing proper alignment of the spring and slide during assembly insertion into the casing. The guide means comprises a pair of guide ribs 76 and 78 integrally formed parallel to the side casing walls on the inner surface of the casing bottom wall 24. A pair of clearance slots 80 and 82 is integrally formed in the lower edge 54 of the slide rear wall 36 to accommodate respectively the guide ribs 76 and 78 during movement of the slide 18.

As embodied herein and as best seen in FIGS. 8 and 10, the guide ribs 76 and 78 are provided on the center of the casing bottom wall 24 extending from opposite sides of the spring recess 60 so that the spring 20 is positioned between the guide ribs 76 and 78. Because a pair of guide ribs is used and the spring 20 is located between these ribs during the movement of the slide, the biasing force of the spring against the slide and the longitudinal movement of the slide toward the front portion of the casing is stabilized. It is preferred that the guide ribs 76 and 78 extend along a substantial portion or the entire length of the inner surface of the casing bottom wall 24 to the open front end 30 of the casing 16 to ensure an easy insertion and alignment of the spring 20 into the casing during assembly of the container. The spring guide ribs angle upwardly at point 79 where the ribs meet the casing rear wall 25 adjacent the spring recess 20 to help center the spring on the rear casing wall in the recess. It can be seen from the foregoing that because of the guide means configuration the spring, when inserted properly, drops into a final position into the spring recess 20 at the rear of the casing and the spring properly biases the slide during operation of the cassette container.

To check that the spring 20 is in the proper position between the casing and slide, a pair of holes 84 (FIG. 9) can be provided in the rear wall 25 of the casing for inspection during production assembly of the container. This is particularly advantageous if the casing 16 is formed of a non-transparent material.

To further increase the rigidity and support of the slide and thus avoid any possible bending and transverse movement in the slide structure itself, cross support ribs 86 may be formed on the slide rear wall 36 as well as support ribs 88 formed on the slide top wall first section 40. These ribs are particularly significant when the overall thickness dimensions of the slide are to be minimized.

With the above configuration for the stop and pivoting means, guide means and rear section of the slide, the stability of the slide and thus the overall operation of the slide can be improved yet simplicity maintained in the component design as well as the thickness of the slide minimized to reduce the overall dimension of the cassette container.

As can be seen from the intercooperation of the spring 20 with the slide 18 and casing 16 described above, the biasing force of the spring will continuously urge the slide 18 outwardly into the cassette-exposing position. Accordingly, the container in accordance with the invention further comprises selectively releasing locking means for retaining the slide 18 within the casing 16 against the biasing force of the spring 20 in the cassette-storing position. While a number of different types of locking means might be contemplated, it has been found that the biasing force of the hourglass-type spring 20 against the slide 18 is fairly strong and thus it is necessary to provide locking means that provides a positive locking of the slide within the casing and that avoids accidental release of the locking means either through accidental hitting of the outer portion of the slide by the container user or through stress or bending of the components, such as the slide or casing.

Figure 2:
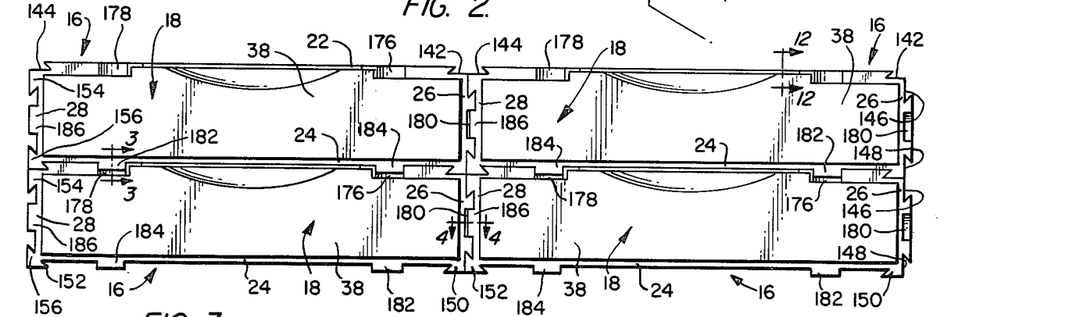
FIG. 2 is a front view of the containers shown in FIG. 1, but with each container in a closed position, and further illustrating the means for detachably connecting and positioning the containers together in a front even alignment.

In addition, the locking means must provide for easy manipulation and grasping by the container user to selectively release the locking means when the container is used by itself or when it is stacked with other similar containers of this invention, as illustrated in FIGS. 1 and 2. Finally, not only is it necessary to provide an easily manipulated and durable and smooth locking means, it is highly desirable to provide locking means which can be readily and easily integrally formed as a part of the molded material of the slide and casing. To achieve the foregoing, the selectively releasable locking means, as herein embodied, includes contact means for allowing finger pressure of the container user to be exerted downwardly on the slide to release the slide from a locking cassette-storing position and to selectively move the slide between the cassette exposing and storing positions. The contact means comprises a concave indentation 90 formed in the outer surface of the slide front wall 38 and top wall second section 42 and a corresponding concave indentation 92 formed in the forward edge of the casing top wall 22 for providing access to the slide concave indentation 90 when the slide is in the locked position. This is best shown in FIGS. 1, 10 and 11. Preferably, an elongated border projection 94 is formed along the edge of the slide top wall second section 42 adjacent the concave indentation 90 which is engageable against the front edge of the casing top wall 22 to prevent further inward movement of the slide 18. The slide front wall 38 can also have a lower edge 96 engageable against the bottom front edge of the casing bottom wall 24 to perform the same stopping function as the border projection 94 formed on the slide top wall.

Figure 12:
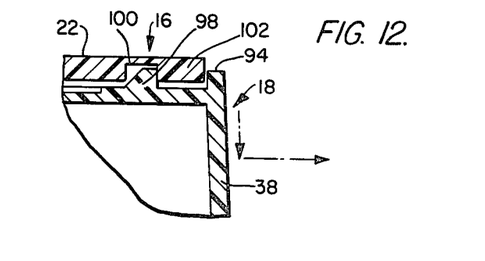
FIG. 12 is a side and partial cross-sectional view taken along line 12—12 in FIG. 2, illustrating in particular portions of the selectively releasable locking means of the container formed on the slide and the casing in engagement with each other to maintain the slide in its cassette-storing position.

As herein embodied the locking means comprises two locking projections 98 and 99 formed on the outer surface edge of the slide top wall second section 42 at opposite ends of the slide concave indentation 90. These projections 98 and 99 are engageable in a recess 100 formed in the inner front edge surface of the casing top wall 22. Fingers 102 and 103 are formed in the casing 16 at opposite ends of the recess 100 for engagement respectively with the locking projections 98 and 99, as illustrated in FIG. 12. It further can be appreciated that the casing locking fingers are advantageously positioned between the slide locking projections and the slide border projection 94 when the slide is in its cassette-storing position. This ensures that the locking mechanism will not accidentally be released. The above locking configuration provides a very positive locking and double latch point mechanism immediately adjacent and at opposite ends of the contact portion of the slidewhich is pushed by the container user.

To release the slide from its locked cassette-storing position, the contact portion of the slide is easily grasped by the container user and pressure is exerted against the front of the slide downwardly. As described earlier, to ensure that the locking mechanism is disengaged when pressure is applied, i.e., projections 98 and 99 are away from fingers 102 and 103, the lower edges 50 of the slide side walls 32 and 34 are tapered inwardly in the front so that the front portion of the slide slightly deforms and pivots about the fulcrum points 51 on the slide side walls. It can be thus seen that there is not only a positive and double locking but also an easy releasing of the slide from its cassette-storing position, particularly when the cassette containers of this invention are stacked in a manner illustrated in FIGS. 1 and 2. Moreover, this combined locking and contact means has a simple configuration to allow easy integral formation as a part of the molded material of the slide and casing.

One of the significant features of the cassette container made in accordance with the invention is to include hublock means for lockingly engaging the hub-openings of a cassette to be inserted into the casing only when the slide is in the cassette-storing position. In designing the hublock means, it was necessary to ensure that the hublock means would always positively engage the cassette hub-openings no matter which way the cassette is inserted into the casing, engage the hub-openings *only* when the slide is in its cassette-storing position, and avoid interfering with the sliding movement of the slide in the casing and the insertion and removal of the cassette when the slide is in its cassette-exposing position.

As herein embodied and as best shown in FIG. 11, the hublock means comprises a first hublock projectin 106 mounted from the top slide wall first section 40 extending downwardly and a second hublock projection 108 mounted from the top slide wall second section 42 extending downwardly. As the slide 18 is moved into the casing 16 to its cassette-storing position, the hublock projections 106 and 108 lockingly engage the hub-openings of a cassette inserted into the casing. To provide proper orientation of hublock projectin 108 into the corresponding hub-opening of the cassette, the hublock projection 108 hasrounded lower lead-in and engaging edges 109 for ensuring alignment of that projectioninto the corresponding hub-opening of the cassette. The first hublock projection 106 has a T-shaped configuration wherein a side wall 110 is of a sufficient length to ensure that there is locking engagement with the hub-opening of the cassette in the slide's cassette-storing position no matter which way the cassette is inserted. The hublock 106 has a further front wall 112 with an inwardly tapered lower forward end 114 for preventing interference with the lead-edge of the cassette being inserted into the casing. This is shown in FIG. 7. Without this tapered forward end 114, the cassette might not be fully inserted and damage to the hublock 106 could occur in trying to force the cassette into the casing.

In the preferred embodiment and as shown in FIG. 11, a flange 116 is integrally formed extending from the top slide wall first section 40 on which is mounted the hublock projection 106. Ribs 118 can be formed extending along the top slide wall first section 40 and the flange 116 for providing further support and rigidity to the first hublock projection 106. This support and rigidity is significant to ensure that the hublock projection 106 is maintained in its positive locking engagement with the hub-opening of an inserted cassette during all operating conditions. The ribs 118 help eliminate the problem of poor locking engagement, particularly when the thicknesses of the slide and flangeare minimized. In addition to providing support and rigidity, the ribs 118 further improve the integral formation of the hublock 106 on the slide by means of injection molding. In essence, the ribs 118 allowa better filling of the plastic material during the molding operation in the cavity which forms the hublock projection 106 as part of the slide.

Since it is extremely important to ensure that there is no interference between the first hublock projection 106 and the flange 116 and a cassette being inserted into or removed from the casing 16, the cassette container as herein embodied and as shown in FIG. 9 further includes a groove 120 having tapered ends 122 formed in the inner surface of the topcasing wall 22 for receiving the flange 116 and the hublock projection 106 when the slide 18 is in its partially-extended upwardly and outwardly cassette-exposing position. The cooperation of the flange and first hublock projection with this groove 120 is best illustrated in FIG. 6.

To provide continuous smooth operation of the slide in the casing and extend the product life of the cassette container, it is necessary to reduce the possibility of damage to any of the slide subcomponents, such as the top slide wallfirst section 40 and the rear hublock projection 106. It has been found, for example, that when the cassette container is stored under fairly high temperature conditions, such as in a parked automobile vehicle, the flange 116, the rear slide wall 36 and the top slide wall first section 40 have a tendency to warp due to the thinness of the plastic mold material with the combined biasing force of spring 20. If this occurs, the hublock projection 106 may no longer engage the cassette hub-opening, the flange 116 may hit the underside surface of the top casing wall 22, and the slide may not lift all the way in its cassette-exposing position. This could cause irreversible damage to the slide or continued proper operation of the slide within the casing. To overcome these problems, interference ribs 126 and 128, as shown in FIGS. 7 and 9, are formed on the inner surface of the top casing wall 22 for engagement against the top slide wall first section 40 to ensure proper alignment and positioning of the first hublock projection 106 and to physically lock the slide with the casing in the slide's cassette-storing position.

Preferably, a pair of bosses 130 and 132 are integrally formed on the upper surface of the slidetop wall first section 40 for providing only two points of engagement with the slide interference ribs 126 and 128 when the slide is in its closed cassette-storing position. These bosses provide the physical locking of the rear portion of the slide yet reduce possible drag of the ribs on the slide during movement between the slide's cassette-storing and cassette-exposing positions. The pair of interference ribs 126 and 128 are formed parallel to the side casing walls 26 and 28 only at the rear portion of the inner surface of the casingtop wall 22 but adjacent and at opposite sides of the first hublock projection 106. Correspondingly, the bosses 130 and 132 are formed in a position to engage respectively with the ribs 126 and 128. The ribs 126 and 128 have front tapered ends 127 and 129 to allow easy re-engagement of the bosses 130 and 132 with the respective ribs as the slide is moved back into the casing to its cassette-storing position. To accommodate the interference ribs 126 and 128 formed on the casing during movement of the slide and to allow free movement of the ribs past the slide rear wall, slots 134 and 136 are formed on the upper edge 56 of the slide rear wall 36 behind the bosses 130 and 132, on opposite sides of the rear hublock projection 106.

Another principal area of concern in the design of this type of cassette container is possible interference of the front portion of the slide 18 when it is being inserted by a container user into the casing during normal use from its outwardly and upwardly extended cassette-exposing position and during initial assembly of the container when the slide 18 is inserted into the casing 16. Since it is highly desirable to initially assemble the slide and casing by automated means, the problem of interference between the front portion of the slide with the casing can become a major problem. In addition, when the cassette containers of this invention are vertically stacked as shown in FIG. 1, the front portion of the slide of a lower container can interfere with the lower portion of the upper container, such as on the slide front wall. To overcome the foregoing problems, as embodied herein and best illustrated by FIG. 11, the second hublock projection 108 is mounted away from a lead-in edge 138 of the top slide wall second section 42. Both the upper edge 140 of the second hublock projection 108 and the lead-in edge 138 of the top slide wall second section, moreover, are rounded. Preferably, the top surface of the top casing second wall section 42 is also relieved. The above design features eliminate the problem of catching of the slide on the forward edge of the top casing wall 22 during normal operation and during initial automated assembly. In addition, it has been found that the rounded lead-in edges 138 and 140 of the slide top wall and hub protection 108 respectively eliminate catching of the slide of a lower container with the front wall of a slide of a container stacked on top of that lower container as illustrated in FIG. 1. As earlier described, the upper edges 46 and 48 of the slide side walls are rounded for the same purpose.

It has been known to store a plurality of cassettes in a block or modular system where a plurality of cassette storage containers is provided. One approach is to integrally form the individual drawer container units together in a storage rack configuration. Another method has been to detachably connect separate cassette containers one above the other and sideways in a modular storage system. It is highly advantageous to use the detachably connectable separate cassette containers so that the modular block of containers can be added to and subtracted from depending upon the desired storage, as well as having the ability to utilize separately only one of the cassette containers. One of the particular problems in applying this modular-type system to cassette containers in accordance with the invention is the upward and outward cassette-exposing position of the slide. A fine frontal alignment of the connected containers must be provided to ensure against intereference between the upwardly extended slide of one container with the front portion of the slide of a container stacked above it. It is also significant to provide a cassette container having the above features which allow for a quick and easy connection between the casings either horizontally or vertically. It is also advantageous to ensure a broad, smooth and planar surface on the top of the casing 16 and a bottom of the casing 16 which rests flat on the surface of a table or the like. While achieving all of the above preferred features, it is essential that the connection and frontal alignment means be easily integrally formed as a part of the casing 16 from a single piece of injection molded material.

To achieve the foregoing objectives, as embodied herein and as best illustrated in FIGS. 1 through 4, the cassette container in accordance with the invention further includes mating track means formed on the top and bottom and side walls 22, 24, 26 and 28, respectively, of the casing 16 for detachably connecting the casing to another similar casing horizontally or vertically to form a modular storage system. The mating track means forms dovetail joints and comprises male dovetails having mating edges 142 and 144 integrally formed in the two outer longitudinal edges of the top casing wall 22 of the container and male dovetails having mating edges 146 and 148 integrally formed in the two outer longitudinal edges of one of the side casing walls, such as side casing wall 26 as shown in FIG. 2. Corresponding to the above male dovetails are female dovetails having mating edges 150 and 152 integrally formed on the two outer longitudinal edges of the bottom casing wall 24 and female dovetails having mating edges 154 and 156 formed on the outer longitudinal edges of the other side casing wall 28.

As best seen in FIGS. 1 and 2, the female dovetail mating edges 150, 152, 154 and 156 are formed only along the front and middle portion of the bottom casing and side walls 24 and 28 and have chamfered rearward ends 158, 160, 162 and 164, respectively. It can be seen that by providing the female dovetail mating edges only along the front and middle portions of the casing walls and having chamfered lead-in rearward ends, there is an extremely easy alignment and insertion of the corresponding male dovetail mating edges of the connecting casing into the corresponding female dovetails. To provide an even easier initial alignment and positioning of the male dovetails between the corresponding female dovetails of the connecting casing, the container includes slightly raised track ribs 166 and 168 formed along the outer longitudinal edges of the bottom casing wall 24 and track ribs 170 and 172 formed along the outer longitudinal edges of the side casing wall 28. These track ribs extend at least along the remaining rear portion of the casing bottom and side walls 24 and 28 so that the male dovetail mating edges of the connecting casing can be initially located between the track ribs of the corresponding casing before mating engagement with the corresponding female dovetails. As can be seen, this particular configuration not only facilitates easy positioning and insertion of the dovetail joints together between the connecting casings in side-by-side relationship and/or stacked one on top of the other, but also continues to provide a broad, smooth and planar surface on the top of each casing 16 and a bottom for the casing which rests flat on the surface of a table or the like. This design also allows for a simple and easy integral molding of the components as a part of the casing.

Figures 3, 4, 5:
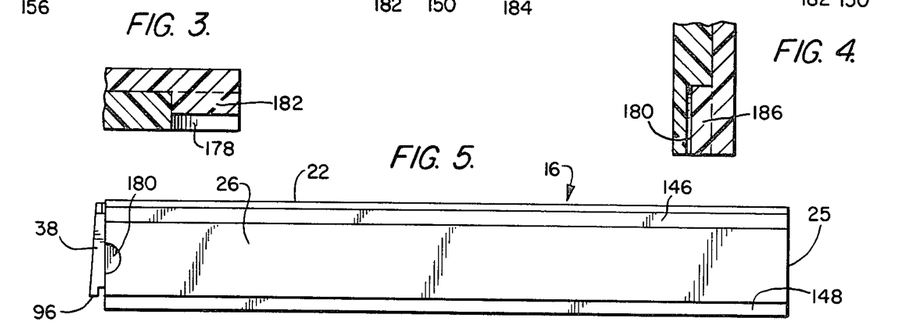
FIG. 3 is a partial side cross-sectional view taken along the line 3—3 in FIG. 2, illustrating in particular the intercooperation of a male nodule and female notch integrally formed at the front edge of the top and bottom walls of each container casing for providing a front even alignment of stacked connected containers.
FIG. 4 is a partial top cross-sectional view taken along the line 4—4 in FIG. 2, illustrating in particular the intercooperation of a male nodule and female notch integrally formed at the front edge of the side walls of each container casing for providing a front even alignment of containers connected in side-by-side relation.
FIG. 5 is a side view of the cassette container in accordance with the invention in its closed position, illustrating in particular the casing side having the female notch formed at the front edge of the side casing wall for engagement with a corresponding male nodule of an adjacent connectable container and a male dovetail guide track formed along the side casing wall for engagement with a corresponding female dovetail guide track of the adjacent connectable container.

To ensure that the casings of the containers to be connected together are in a proper front even alignment, the cassette container in accordance with this invention further includes front end alignment and locking means. In providing such a front end alignment and locking mechanism, the same criteria must be met as those described above for the container connecting mechanism. As embodied herein and as best illustrated in FIGS. 1 and 9, the locking and alignment means comprises a pair of female notches 176 and 178 formed in the forward edge of the top casing wall 22 and a female notch 180 formed in the foreward edge of the side casing wall 26 having the male dovetail joints 146 and 148. Corresponding to the above female notches are male nodules 182 and 184 formed at the forward edge of the bottom casing wall 24 and a male nodule 186 formed at the forward edge of the sidecasing wall 34 having the female dovetail joints 154 and 156. As can be seen from FIG. 2, the male nodules 182 and 184 of a container stacked on top of another container engage the female notches 176 and 178 of the bottom container. The particular alignment and engagement of a pair of these notches and nodules are illustrated in FIG. 3. In a similar fashion, a cassette container to be connected to another container in side-by-side relationship has its male nodule 186 engaging the opposing female notch 180 of the container positioned adjacent to it.

To ensure a snug or firm locking engagement of two containers and to maintain a proper front even alignment of these two containers when stacked one on top of the other, the front end alignment and locking means further includes interference ramp means. As herein embodied, the ramp means comprises a pair of ramps 188 and 190 formed on the front portion of the bottom casing wall 24 between male nodules 182 and 184 and female dovetail edges 150 and 152, respectively. Thus when a container is connected to another container in stacked relationship, the interference caused by the ramps 188 and 190 of the top container with the front portion of the top casing wall 22 of the bottom container tightens the engagement of the mating female joints 150 and 152 with the male joints 142 and 144 of the corresponding containers. Because of the placement of the ramps in the very front of the casing bottom wall, the tightening occurs only at the fully aligned and locking position of the two containers. This tightening function is important to ensure continued front even alignment so that there is no interference between the upwardly extending side of one container with the front portion of the slide of a container stacked above it.

It can be seen from the foregoing that this particular front end alignment and locking means configuration not only provides for an even front end positioning of casings to be connected together, but also one that allows for a simple and easy integral molding of the components as a part of the casing 16. It should be noted that the male nodules are such that they do not extend beyond or interfere with the front portion of the casing or project beyond the dovetailing of the casing. Therefore, for example, the bottom of the casing still rests flat on the surface of a table or the like and the female notches in the front edge of the top casing wall do not interfere with the broad, smooth and planar surface on the casing top.

In view of the foregoing written description of the preferred embodiment and accompanying drawings, it is seen that the cassette container of this invention achieves a combination of advantages and improvements in the art. First, the container of the invention allows for direct insertion of a cassette into the casing with the slide reciprocally received in the casing for urging the cassette along the inner surface of the casing. Secondly, the cassette container of the type disclosed and described above is simple in construction and has components which can be readily formed of injection molded plastic material into a two-piece construction (with the exception of the spring biasing means). Thirdly, the above-described type of cassette container allows for the three basic components, i.e., the spring, slide and casing, to be easily assembled by automated production means. Fourthly, the above type of cassette container has a very smooth movement of the slide in the casing between the cassette-storing position and the partially-extended upwardly and outwardly cassette-exposing position. Fifthly, the cassette container of the type described above is durable during continued usage as well as under adverse operating circumstances (e.g., at high temperatures) which would tend to otherwise bow or warp the slide and casing subcomponents and thus make the container inoperative. Sixthly, the cassette container of the type described above is both versatile and can allow for variations in the component dimensions yet still maintain a very satisfactory and smooth operation of the container. Seventhly, the cassette container of the invention minimizes overall dimensions. Finally, it can be seen that the cassette container described above can be very easily and quickly connected and very evenly and tightly aligned in the front portion in a modular block formation either stacked one on top of the other or in side-by-side relationship, or both.

It will be apparent to those skilled in the art that modifications and variations could be made to the above container for holding a cassette in accordance with the teachings of the invention without departing from the spirit or scope of the invention. Thus, it is intended that the present invention cover the modifications and variations of this invention within the scope of the appended claims and their equivalents.

We claim:

1. A container for holding a cassette comprising:
   (a) a rectangular casing having top, bottom and side walls, a rear wall and an open front;
   (b) a frame-like bottomless slide reciprocally received in the casing for urging a casette along the inner surface of the casing bottom wall, said slide being slidable between a cassette-storing position within the casing and a cassette-exposing position partially-extended upwardly and outwardly from the casing and comprising side, rear and front walls, and a partial cutaway supporting and mounting top wall, wherein said top wall has a first section formed adjoining the rear and side slide walls and a second section formed adjoining the front and side slide walls, and wherein said side walls have upper edges tapered inwardly from the rear to a middle portion for allowing an upwardly tilting inclination of the slide against the casing top wall in the cassette-exposing position and lower edges tapered inwardly from the middle portion to the front for increased access to a stored cassette in the cassette-exposing position and for providing a pivoting point for the front portion of the slide in the cassette-storing position;
   (c) spring means positioned between the rear walls of said casing and slide for biasing the slide toward the upwardly and outwardly extending cassette-exposing position,
   (d) selectively releasable locking means comprising
      (i) contact means for allowing finger pressure to be exerted downwardly on the slide to release the slide from a locked cassette-storing position and to selectively move the slide between the cassette exposing and storing positions, said contact means comprising a concave indentation formed in the outer surface of the front and top slide walls and a concave indentation formed in the forward edge of top casing wall for providing access to the slide concave indentation when the slide is in the locked position, and (ii) locking means for retaining the slide in the cassette-storing position, said locking means comprising projections formed on the outer surface of the slide top wall second section adjacent and at opposite ends of the slide concave indentation, a recess formed in the inner surface of the casing top wall adjacent the casing concave indentation for receiving the slide locking projections when the slide is in the cassette-storing position and fingers formed at opposite forward ends of the recess adjacent the casing concave indentation for lockingly engaging the slide locking projections when the slide is in the cassette-storing position; and, (e) stop and pivoting means for limiting movement of the slide to the partially-extended upwardly and outwardly cassette-exposing position, said stop and pivoting means comprising a pair of projections formed on the upper edge of the rear slide wall and a pair of grooves formed parallel to the side casing walls in the inner surface of the top casing wall and in which the slide stop projections slidably move, said slide stop projections engaging the forward ends of the grooves for limiting further outward movement of the slide from the casing and for establishing a pivoting point for the upwardly tilting movement of the slide against the top casing wall in the cassette-exposing position.

2. The container of claim 1 wherein said selectively releasable locking means further comprises a raised border formed around the slide concave indentation on the outer surface of the top slide wall second section, said raised border engaging the forward edge of the casing top wall to limit further movement of the slide into the casing and wherein said casing locking fingers are lockingly positioned between the slide locking projections and the slide raised border when the slide is in the cassette-storing position.

3. The container of claim 1 wherein said spring means is located between said pair of stop and pivoting slide projections and casing grooves.

4. The container of claim 1 further comprising guide means for maintaining the cassette in a level position in the casing and for providing alignment of the spring means during assembly insertion into the casing, said guide means comprising a pair of ribs formed parallel to the side casing walls on the inner surface of the bottom casing wall and a pair of slots formed in the lower edge of the rear slide wall for accommodating the pair of ribs.

5. The container of claim 4 wherein said spring means is located between said pair of casing guide ribs and slide slots.

6. The container of claim 5 wherein said pair of casing guide ribs extend along said bottom casing wall to the front edge at the casing opening for providing easy and proper alignment of the spring means and slide during assembly insertion into the casing.

7. The container of claim 1 further comprising hublock means for lockingly engaging the hub-openings of an inserted cassette only when the slide is in the cassette-storing position, said hublock means comprising a first hublock projection mounted from the top slide wall first section extending downwardly and a second hublock projection mounted from the top slide wall second section extending downwardly.

8. The container of claim 7 wherein a flange is integrally formed extending from the top slide wall first section and on which is mounted the first hublock projection and wherein the first hublock projection has an inwardly tapered forward end for preventing interference with the lead edge of a cassette being inserted into the casing.

9. The container of claim 8 further comprising ribs formed extending along the top slide wall first section to the flange for providing support to the first hublock projection.

10. The container of claim 8 further comprising a groove having tapered ends formed in the inner surface of the top casing wall for receiving the flange and first hublock projection when the slide is in the cassette-exposing position and preventing interference of the first hublock projection and flange with a cassette being inserted into or removed from the casing.

11. The container of claim 8 wherein at least said second hublock projection has rounded lower lead-in edges for ensuring alignment of said second hublock projection into the corresponding hub-opening of the cassette.

12. The container of claim 7 or 8 further comprising interference ribs formed on the inner surface of the top casing wall for engagement against the top slide wall first section to ensure proper alignment and positioning of the first hublock projection during operating conditions.

13. The container of claim 12 further comprising slots formed on the upper edge of the rear slide wall for accommodating the casing interference ribs during sliding movement of the slide.

14. The container of claim 13 wherein said interference ribs comprise a pair of ribs formed parallel to the side casing walls at the rear portion of the casing inner surface top wall operatively located on opposite sides of said first hublock projection and wherein said interference slots comprise a pair of slots positioned on said rear formed side wall for accommodating said ribs on opposite sides of said first hublock projection.

15. The container of claim 14 further comprising a pair of bosses formed on the outer surface of the top slide wall first section for providing engaging points with the casing interference ribs.

16. The container of claim 7 wherein the second hublock projection is mounted away from the lead-on edge of the top slide wall second section and wherein the lead-in top edge of the second hublock projection and lead-in edges of the top slide wall second section are rounded for facilitating insertion of the slide into the casing.

17. The container of claim 1 wherein the upper edges of the tapered slide middle portion are rounded for facilitating movement of the slide in and out of the casing.

18. The container of claim 17 wherein the top surface of the top slide wall second section is relieved for preventing interference with the top casing wall during movement of the slide in and out of the casing.

19. The container of claim 1 wherein the lower edge of the slide rear wall is positioned above the lower edge of the slide side walls for reducing drag on the inside surface of the bottom casing wall during sliding and pivoting movement of the slide.

20. The container of claims 1 or 19 wherein the upper edge of the rear slide wall is positioned above the top slide wall first section for reducing interference between the top slide wall first section and the inside surface of the top casing wall during sliding and pivoting movement of the slide.

21. The container of claim 1 or 19 wherein the side slide walls have lower rear edges tapered inwardly for ensuring the upward and pivoting movement of the slide against the top casing wall in the cassette-exposing position.

22. The container of claim 21 wherein the rear slide wall has cross ribs and said top slide wall first section has ribs for increased support and rigidity of the rear portion of the slide.

23. The container of claim 1 wherein the spring means comprises a spring which collapses inside itself.

24. The container of claim 23 wherein the spring comprises an hourglass-type spring.

25. The container of claim 24 further comprising a pair of vertical ribs formed on the inner surface of the rear casing wall for positioning and alignment of one end of the spring therebetween and a recess formed in the rear slide wall of the slide for positioning and alignment of the other end of the spring therebetween.

26. The container of claim 25 further comprising a projection formed in the spring recess on the rear slide wall for alignment of the hourglass-type spring in said recess.

27. The container of claims 25 or 26 wherein the vertical edges of the spring recess formed with the rear slide wall are chamfered for alignment of the hourglass-like spring in said recess.

28. The container of claims 23 or 27 wherein the spring is positioned between the central portions of the casing and slide rear walls from the side walls and provides a biasing force against the lower portion of the rear slide wall.

29. The container of claim 1 wherein at least one hole is formed in the rear casing wall for providing visual inspection of the position of the slide within the casing.

30. The container of claim 1 or 26 further comprising mating track means formed on the top and bottom and side walls of the casing for detachably connecting the casing to another similar casing horizontally or vertically to form a block, said track means forming dovetail joints and comprising male dovetails having mating edges formed on the outer longitudinal edges of the top casing wall and one of the side casing walls and female dovetails having mating edges formed on the outer longitudinal edges of the bottom casing wall and the other of the side casing walls.

31. The container of claim 30 wherein the female dovetail mating edges are formed only along the front and middle portion of the side and bottom casing walls and have chamfered rearward ends for allowing easy alignment and insertion of the male dovetail mating edges of the connecting casing into the corresponding female dovetail mating edges.

32. The container of claim 30 further comprising locking means for positioning the casings to be connected together in a front even alignment, said locking and positioning means comprising female notches formed in the forward edge of the top casing wall and one of the side casing walls and male nodules formed at the forward edge of the bottom casing wall and the other of the side casing walls.

33. The container of claim 32 wherein the female notch is formed on the side casing wall having the male dovetail joints and the male nodule is formed on the side casing wall having the female dovetail joints.

34. The container of claim 31 wherein slightly raised track ribs are formed along the edges of the bottom and side casing walls having the female dovetails and extending from the chamfered rearward ends of the female dovetail mating edges along the remaining portion of the bottom and side walls for providing an initial positioning of the male dovetails of a connecting casing between the track ribs of the corresponding casing wall.

35. The container of claim 30 or 32 further comprising ramp means formed on the front portion of the bottom casing wall adjacent the female dovetail mating edges for tightening the engagement of the female dovetail mating edges of that container with the corresponding male dovetail mating edges on the top casing wall of another container connected in stacked relationship.

36. The container of claim 30 or 32 wherein the dovetail joints and locking and positioning means are integrally formed with the casing from a single piece of molded material.

37. A container for holding a cassette comprising:
(a) a rectangular casing having top, bottom and side walls, a rear wall and an open front;
(b) a frame-like bottomless slide reciprocally received in the casing for urging a casette along the inner surface of the casing bottom wall, said slide being slidable between a cassette-storing position within the casing and a cassette-exposing position partially-extended upwardly and outwardly from the casing and comprising side, rear and front walls, and a partial cutaway supporting and mounting top wall, wherein (i) said top wall has a first section formed adjoining the rear and side slide walls and a second section formed adjoining the front and side slide walls, (ii) the rear slide wall has a lower edge positioned above the lower edge of the slide side walls for reducing drag on the inside surface of the bottom casing wall during sliding and pivoting movement of the slide and an upper edge positioned above the top slide wall first section for reducing interference between the top slide wall first section and the inside surface of the top casing wall during sliding and pivoting movement of the slide, and (iii) said side walls have (1) upper edges tapered inwardly from the rear to a middle portion for allowing an upwardly tilting inclination of the slide against the casing top wall in the cassette-exposing position, said upper edges being rounded for facilitating movement of the slide in and out of the casing and (2) lower edges tapered inwardly from the middle portion to the front for increased access to a stored cassette in the cassette-exposing position and for providing a pivoting bending point for the front portion of the slide in the closed cassette storing position, and tapered inwardly in the rear for ensuring the upward and pivoting movement of the slide against the top casing wall in the cassette-exposing position;
(c) spring means positioned between the rear walls of said casing and slide for biasing the slide toward the upwardly and outwardly extended cassette-exposing position, said spring means comprising an hourglass-type spring which collapses inside itself and which is positioned between the central portions of the casing and slide rear walls from the side walls and provides a biasing force against the lower portion of the rear slide wall;

(d) selectively releasable locking means comprising
  (i) contact means for allowing finger pressure to be exerted downwardly on the slide to release the slide from a locked cassette-storing position and to selectively move the slide between the cassette exposing and storing positions, said contact means comprising a concave indentation formed in the outer surface of the front and top slide walls and a concave indentation formed in the forward edge of top casing wall for providing access to the slide concave indentation when the slide is in the locked position, and
  (ii) locking means for retaining the slide in the cassette-storing position, said locking means comprising projections formed on the outer surface of the slide top wall second section adjacent and at opposite ends of the slide concave indentation, a recess formed in the inner surface of the casing top wall adjacent the casing concave indentation for receiving the slide locking projections when the slide is in the cassette-storing position in the casing, fingers formed at opposite forward ends of the recess adjacent the casing concave indentation for lockingly engaging the slide locking projections when the slide is in the cassette-storing position;

(e) stop and pivoting means for limiting movement of the slide to the partially-extended upwardly and outwardly cassette-exposing position, said stop and pivoting means comprising a pair of projections formed on the upper edge of the rear slide wall and a pair of grooves formed parallel to the side casing walls in the inner surface of the top casing wall and in which the slide stop projections slidably move, said slide stop projections engaging the forward ends of the grooves for limiting further outward movement of the slide from the casing and for establishing a pivoting point for the upwardly tilting movement of the slide against the top casing wall in the cassette-exposing position;

(f) guide means for maintaining the cassette in a level position in the casing and for providing alignment of the spring during assembly insertion into the casing, said guide means comprising a pair of ribs formed parallel to the side casing walls on the inner surface of the bottom casing wall and a pair of slots formed in the lower edge of the rear slide wall for accommodating the guide ribs; and, (g) hublock means for lockingly engaging the hubopenings of an inserted cassette only when the slide is in the cassette-storing position, said hublock means comprising a first hublock projection mounted from the top slide wall first section extending downwardly and having an inwardly tapered forward end for preventing interference within the lead edge of a cassette being inserted into the casing and a second hublock projection mounted from the top slide wall second section extending downwardly.

* * * * *